March 14, 1944.   E. N. JACOBI   2,343,976
COMBINED STEERING POST AND IGNITION LOCK
Filed Dec. 19, 1941   5 Sheets-Sheet 1
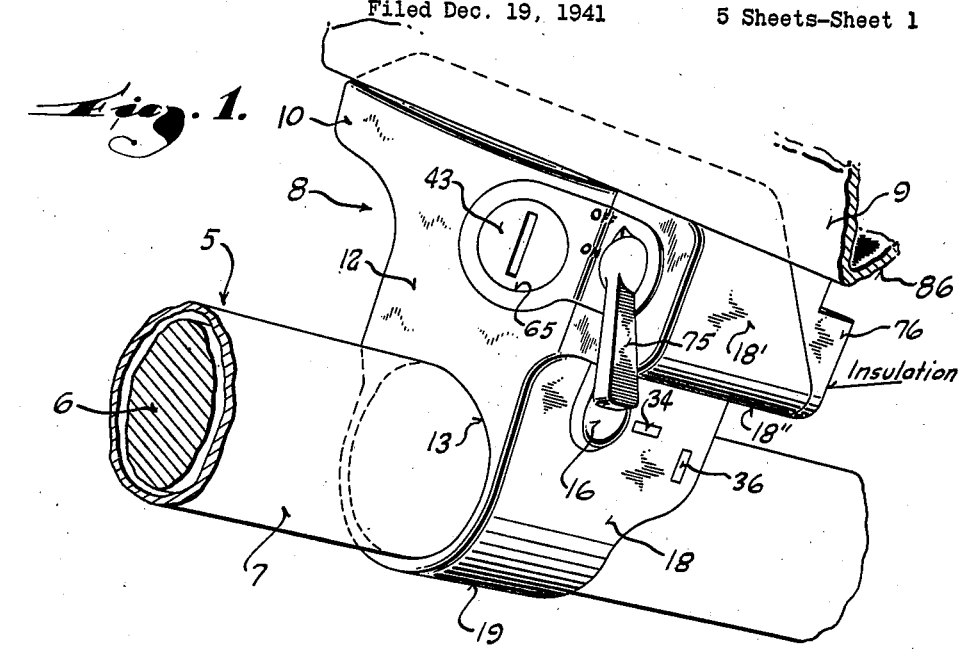
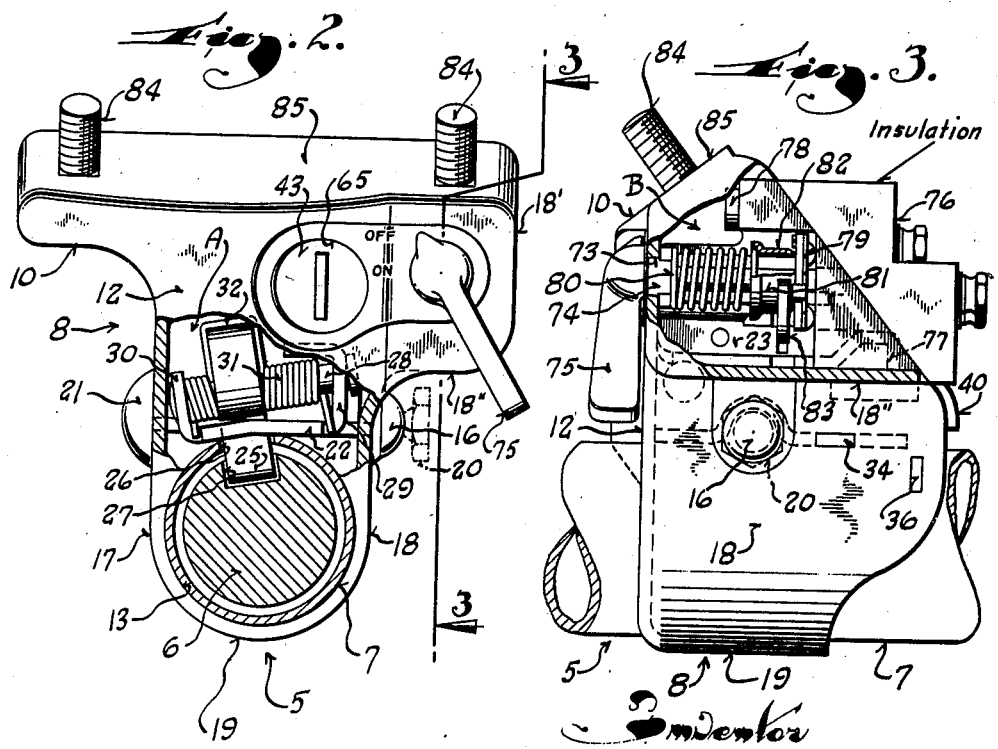
Inventor
Edward N. Jacobi

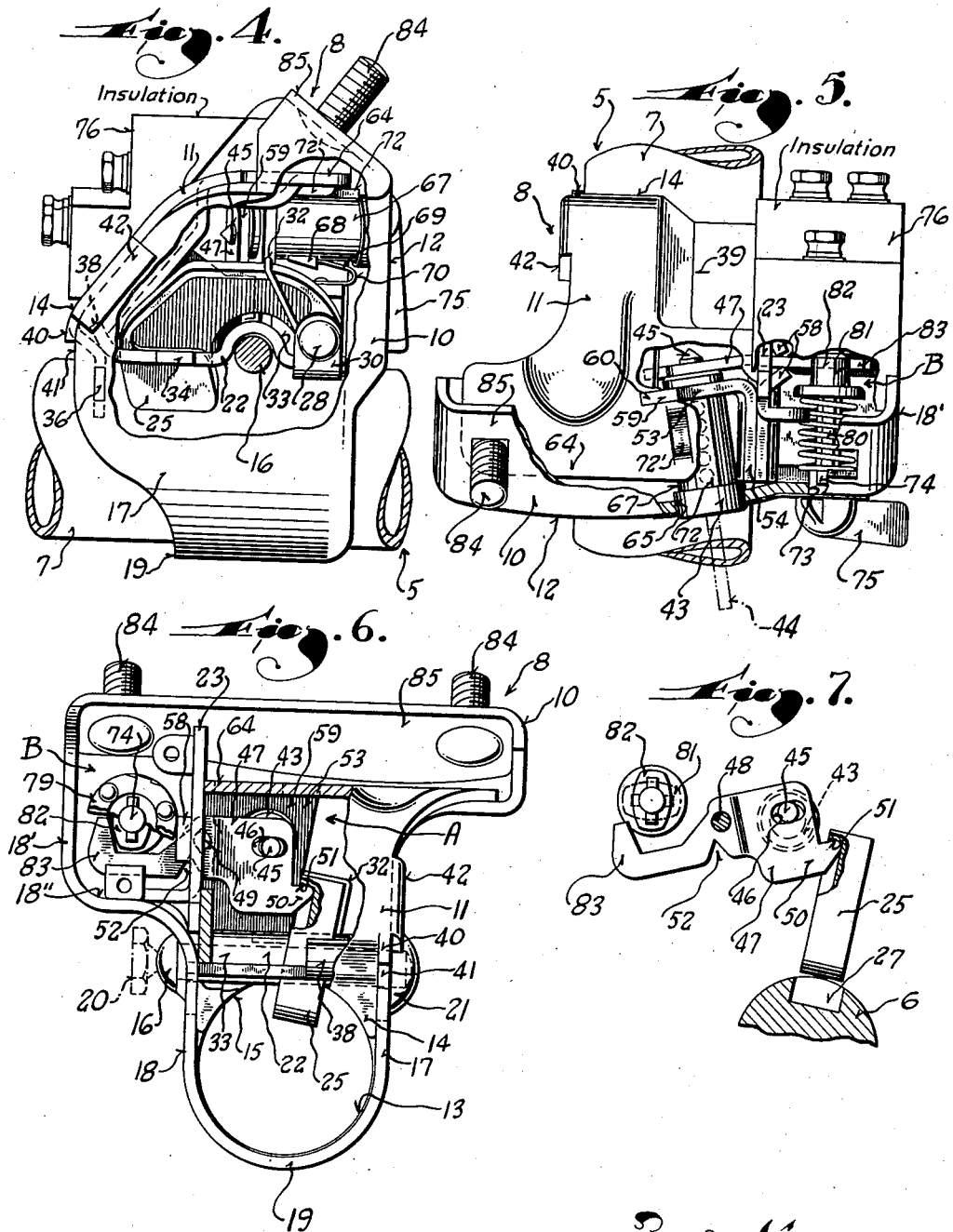

March 14, 1944.  E. N. JACOBI  2,343,976
COMBINED STEERING POST AND IGNITION LOCK
Filed Dec. 19, 1941  5 Sheets-Sheet 3
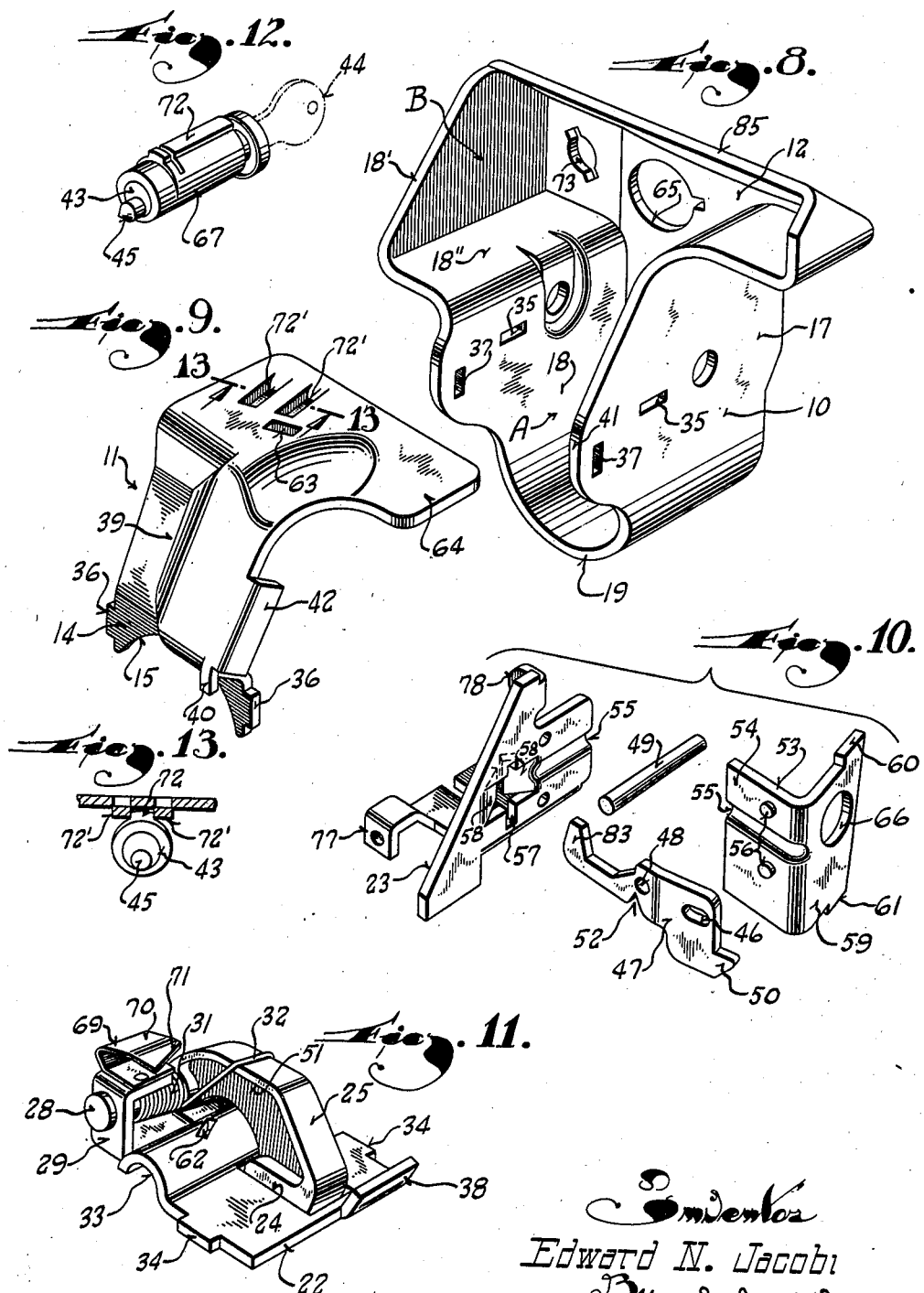
Inventor
Edward N. Jacobi
By
Attorney March 14, 1944.  E. N. JACOBI  2,343,976
COMBINED STEERING POST AND IGNITION LOCK
Filed Dec. 19, 1941  5 Sheets-Sheet 4
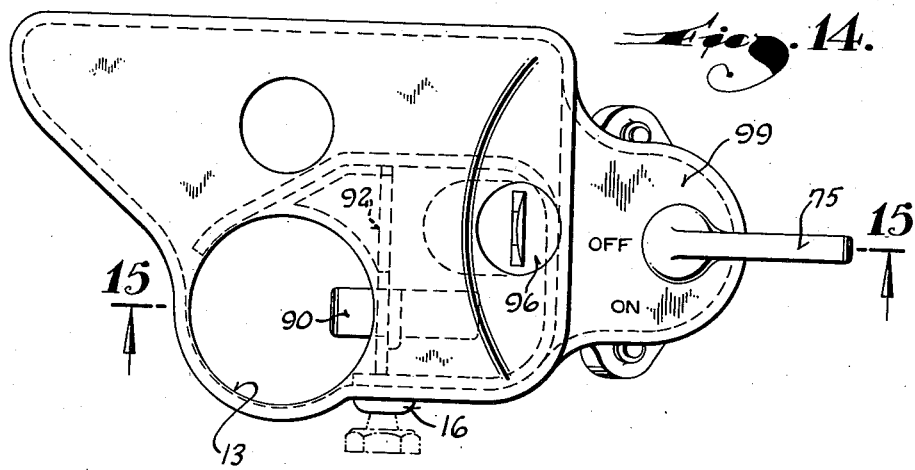
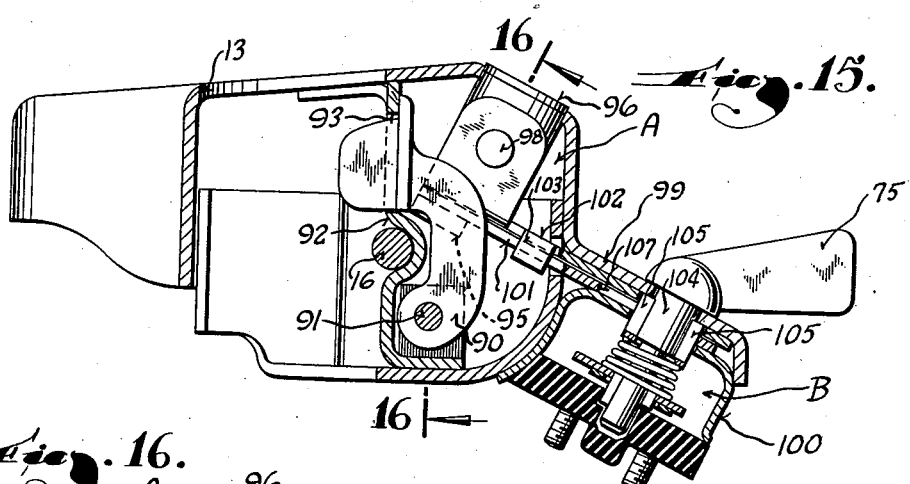
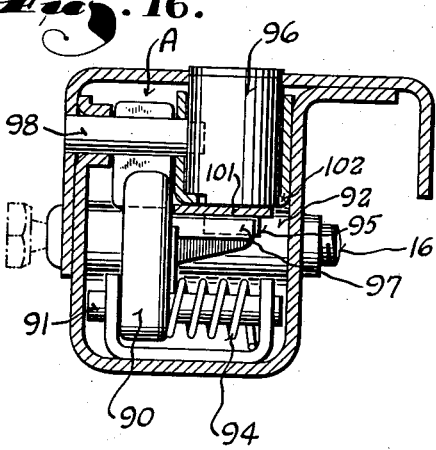
Inventor
Edward N. Jacobi March 14, 1944. E. N. JACOBI 2,343,976
COMBINED STEERING POST AND IGNITION LOCK
Filed Dec. 19, 1941 5 Sheets-Sheet 5
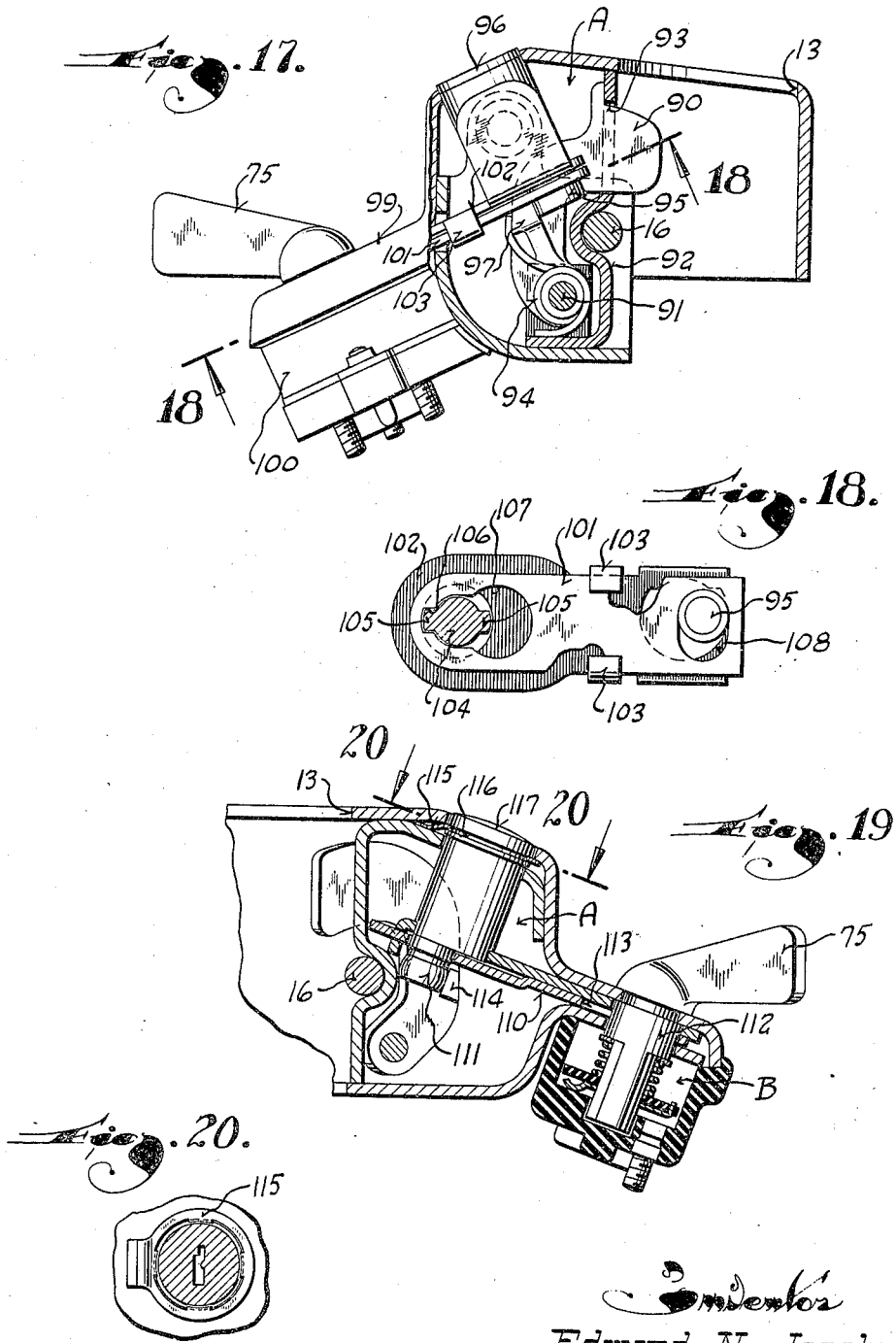

Patented Mar. 14, 1944

2,343,976

UNITED STATES PATENT OFFICE 2,343,976

COMBINED STEERING POST AND IGNITION LOCK

Edward N. Jacobi, Milwaukee, Wis., assignor to Briggs & Stratton Corporation, Milwaukee, Wis., a corporation of Delaware Application December 19, 1941, Serial No. 423,573

21 Claims. (Cl. 70—252)

This invention relates to locks and refers particularly to combined steering post and ignition locks sometimes known as coincidental locks.

It is now standard practice in many makes of automobiles to mount the ignition switch in a bracket by which the steering column is supported from the dashboard, and to provide a lock mechanism for the ignition switch which also controls a bolt mounted in the bracket and adapted for locking engagement with the rotatable shaft of the steering column.

In lock devices of this type heretofore and now in use, the bracket housing the lock and switch mechanisms is a malleable iron casting, the cost of which is quite high compared to the cost of sheet steel used for stampings.

Thus, with a view towards reducing the cost of lock devices of this type, the present invention has as its primary object the provision of a combined ignition and steering post lock wherein the bracket which houses the switch and lock mechanisms is fabricated entirely of sheet metal stampings.

The difference in the cost of the sheet metal for the stampings and the cost of the malleable iron used for casting the brackets as has been the practice heretofore, represents the saving effected. The cost of assembling the stamped parts of the fabricated bracket plus the prorated original cost of the dies is no greater than the cost of machining, assembling, and finishing the bracket castings.

Another very desirable advantage of the use of sheet steel for the housing is that it permits hardening and thus enables the housing to be rendered quite safe against attack by drilling and sawing.

In the lock devices of the past where the housing was cast, the most expedient type of bolt was a sliding plunger as it was easy to bore a cylindrical hole to receive the same. However, with a stamped construction like the present, it is obvious that an entirely different form of bolt construction must be employed.

It is, therefore, another object of this invention to provide a bolt construction suitable for use in a stamped housing.

More specifically, it is an object of this invention to provide a pivoted bolt biased to an operative position engageable with the rotatable shaft of the steering column.

To insure an adequately strong bolt construction, this invention further provides means for supporting the bolt independently of its pivot and at a point closely adjacent to its engagement with the shaft of the steering column.

Another object of this invention resides in the provision of a fabricated bracket and housing for the purpose described, which is so designed that the bolt operates in a compartment closed against the ingress of picking tools or wires which might be used to surreptitiously actuate the bolt.

Another object of this invention is to provide a fabricated structure of the character described which is clamped to the steering column by means of a tension screw and which is internally reinforced to preclude collapsing the sides of its housing by the tightening of the screw.

Another object of this invention is to provide a combination bolt actuator and switch locking lever so designed that force applied to its switch locking portion breaks the lever and thus prevents unauthorized retraction of the bolt although forced access may be gained to the interior of the switch compartment.

Anoher object of this invention is to provide a simplified manner of interlocking the bolt and ignition switch by which the spring bolt is free to engage the steering post and secure the same against rotation only after the ignition switch has been turned "off" and locked, or in other words, by which locking of the steering post is precluded as long as the ignition switch is in its "on" position, and by which unlocking of the steering gear before the ignition is switched on and the engine started is assured.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of the physical embodiment of the invention constructed according to the best modes so far devised for the practical application of the principles thereof, and in which:

Figure 1 is a perspective view of a combined steering post and ignition switch lock embodying one form of this invention;

Figure 2 is a front view thereof with parts broken away and with the steering column in section;

Figure 3 is a view partly in side elevation and partly in section taken on the plane of the line 3—3 of Figure 2;

Figure 4 is a view showing the side of the structure opposite that shown in Figure 3, parts thereof being broken away and in section;

Figure 5 is a top view of the unit with parts broken away and in section;

Figure 6 is a back view thereof also with parts broken away and in section;

Figure 7 is a detail view illustrating particularly the interlock between the bolt and the actuator of the ignition switch;

Figure 8 is a perspective view of one of the two stampings which together comprise the housing or bracket and which may be considered the body of the housing;

Figure 9 is a perspective view of the other one of the two component parts of the stamped housing and bracket, said part being the cover for the body;

Figure 10 is a perspective view of the several stampings which when assembled constitute the bolt actuator assembly;

Figure 11 is a perspective view of the spring bolt and the stamping on which it is mounted;

Figure 12 is a perspective view of the lock casing with the lock cylinder therein;

Figure 13 is a fragmentary detail view through part of the cover, said view being taken on the plane of the line 13—13 in Figure 9 and illustrating the manner in which the lock casing is secured against rotation;

Figure 14 is a front view of another embodiment of this invention;

Figure 15 is a sectional view through the structure shown in Figure 14, said view being taken on the plane of the line 15—15 in Figure 14;

Figure 16 is a sectional view taken through Figure 15 on the plane of the line 16—16;

Figure 17 is a back view of the unit shown in Figure 14 with parts broken away and in section, and taken from the direction opposite that of Figure 15;

Figure 18 is a detail sectional view taken through Figure 17 on the plane of the line 18—18;

Figure 19 is a cross sectional view similar to Figure 15 but showing a slightly modified manner of interlocking the bolt, ignition switch and lock cylinder and a different manner of securing the lock casing in place; and Figure 20 is a fragmentary detail sectional view taken through Figure 19 on the plane of the line 20—20.

Referring now particularly to the accompanying drawings and especially to Figures 1 to 13, inclusive, the numeral 5 designates generally a steering column or post which as is customary consists of an inner rotatable shaft 6 within an outer stationary tube 7.

Mounted on the steering column is a combined steering gear and ignition-switch lock indicated generally by the numeral 8, the housing of which serves as a bracket to support the steering column from the underside of the dashboard 9 to which the housing of the lock structure is secured.

The housing for the lock structure is fabricated entirely of sheet metal stampings and consists of a body 10 shown in detail in Figure 8 and a cover 11 particularly illustrated in Figure 9. In the final assembly these two stampings are spot welded together so as to form one rigid structure.

The front wall 12 of the body stamping has a round hole 13 therein of a size to accommodate the tube 7 and the extreme back wall portion 14 of the cover which serves to close the open back of the body has its edge 15 shaped to closely fit the side of the tube 7.

To hold the housing structure on the steering column a tension screw 16 connects the opposite side walls 17 and 18 of the body to draw the same tightly about the tube. It is to be observed that the side walls 17 and 18 merge with one another to form the semi-cylindrical bottom 19 of the body which embraces the tube 7.

The head of the clamping screw 16 is initially provided with a hexagonal projection 20 to enable the application of turning force thereon; and after the screw is threaded into its round headed nut 21, this hexagonal projection is cut off so that subsequent unauthorized loosening of the assembly from the post is prevented.

During the tightening of the tension screw 16 the side walls 17 and 18 of the body are drawn together as described. A spreader plate 22 is mounted in the body between the side walls to hold the same against being collapsed by excessive tightening of the tension screw. This spreader plate, as best shown in Figures 2 and 6, is substantially tangential to the tube 7 and closes off the space within the body from the opening through which the steering column passes.

Hence, the spreader plate in cooperation with the side walls 17 and 18, and the front wall 12 of the body, the cover 11 and a partition wall 23 to be hereinafter more fully described, defines a closed bolt compartment A. A hole 24 in the spreader plate communicates this closed bolt compartment with the opening in which the steering column is received and provides for the projection of a bolt 25 from the closed bolt compartment A into the steering column opening. The projected end of the bolt passes through a slot 26 in the tube 7 to enter a keeper recess 27 in the rotatable shaft 6 (see Figure 2).

The bolt 25 is preferably a drop-forging and is pivotally mounted on a pin 28. The pin 28 is carried by the spreader plate and has its opposite ends fixed in upstanding projections 29 and 30 formed as integral parts thereof.

A torsion spring 31 biases the bolt to its operative position projecting into locking engagement with the keeper recess 27. This spring has two axially spaced coil sections mounted on the pin 28 at opposite sides of the bolt with the free ends thereof bearing against the adjacent edge of the spreader plate and its medial looped portion 32 embracing the bolt and imparting the force of the spring thereto.

It is to be observed that the spreader plate is medially arched as at 33 to accommodate the tension screw 16 and the hole 24 therethrough which accommodates the free end of the bolt is in the flat part of the spreader plate remote from the pivot pin 28. This flat part of the spreader plate has tongues or tenons 34 projecting from opposite sides thereof to engage in holes or mortises 35 in the side walls 17 and 18 of the body. This same manner of assembly is employed to properly locate the cover 11 on the body. That is, the wall 14 of the cover has tongues or tenons 36 projecting therefrom to engage in holes or mortises 37 in the side walls 17 and 18 of the body.

To return to the bolt and its mounting, attention is directed to the fact that the hole 24 in the spreader plate through which the bolt projects fits the sides of the bolt quite closely. Consequently, any stress applied to the bolt by turning force on the shaft 6 is carried by the spreader plate and not by the pivotal mounting of the bolt.

This provides an exceptionally strong construction and makes the lock strong enough to withstand any force that may be applied to the steering wheel and its spokes without breaking these parts.

As stated hereinbefore, the bolt is mounted in a closed compartment designated A. If it were possible to insert a wire or picking tool into this compartment the bolt might be retracted and the lock defeated.

In view of the fact that the hole 13 in the front of the body fits the tube 7 snugly, ingress to the bolt compartment cannot be had here. The only point of possible admission thus is at the back where the cover 11 joins the body and contacts the tube 7.

Due to the necessity for assembling the mechanism in the body and the limitations imposed by stamping requirements, it is, of course, necessary that the body be open either at the back or some other place and that a separate cover be provided.

The most vulnerable of the possible points of entry into the bolt compartment A is the area directly adjacent to the rear wall 14 of the cover. Hence, to block the path of any tool or wire inserted through the crevice between the points or ends of this wall and the side of the tube, the spreader plate has a lip or flange 38 extending therefrom opposite the end of the bolt as best shown in Figure 6. As shown in dotted lines in Figure 4, this lip or flange blocks the one opening which cannot be completely closed and thus prevents access to the bolt.

At the opposite side of the bolt, the rounded or depressed formation 39 of the cover affords protection and prevents access to the bolt.

Closure of possible crevices is also the function of a tongue 40 extended down from the cover to overlie the edge 41 of the body and of a flange 42 struck down from the cover and in position to overlie the outer face of the side wall 17 of the body.

Thus when the cover is secured to the body which as stated hereinbefore is effected by spot welding, the bolt compartment A is secure against the insertion of picking tools which might be used to retract the bolt.

The only way in which the bolt may be retracted is by rotation of a lock cylinder 43 effected through the use of a proper key 44. The lock has the usual eccentric cam or driving lug 45 projecting from its inner end which, by its engagement in a slot 46 in a pivoted bolt actuator 47, translates rotation of the lock cylinder into bolt retraction motion of the actuator.

The actuator 47 is a stamping having a medially located hole 48 by which it is pivoted on a pin 49. That end portion of the actuator in which the slot 46 is located is comparatively husky and has a finger 50 projecting therefrom to engage under a shoulder 51 on the bolt and retract the same upon unlocking rotation of the cylinder.

The opposite end portion of the actuator is lighter in construction and provides the interlock to the ignition switch. This latter end portion is more or less isolated from the rest of the actuator by a narrow frangible throat 52 adjacent to the pivot hole 48. This frangible throat is designed to give way under force applied to the actuator from inside the switch compartment in an effort to retract the locked bolt. Retraction of the bolt is thus precluded even though forced access may be gained to the interior of the switch.

The pin 49 on which the actuator is pivoted is anchored in an assembly particularly shown in Figure 10 and which consists of the partition wall 23 and an angular stamping 53. The partition wall 23 and the leg 54 of the angular stamping 53 have contiguous grooves 55 in which the pivot pin 49 is disposed upon assembly of the angular stamping with the partition wall. Dowels 56 serve to properly locate these parts and spot-welding secures them together.

Prior to the assembly of the angular stamping with the partition wall, the actuator is mounted on the pin 49 and its switch locking end portion is passed through a slot 57 in the partition wall. The sides of the slot 57 are struck outwardly as at 58 to extend the point of emergence of the actuator from the hole in the partition wall to encompass the frangible throat, and also to support the actuator against rocking laterally on the pivot pin.

As noted hereinbefore, the partition wall 23 constitutes one wall of the closed bolt compartment A. Thus, the husky end portion of the actuator which carries the bolt engaging finger is inside the bolt compartment while its opposite lighter end portion is outside the bolt compartment and the frangible throat 52 is adjacent to the slot 57 in the partition wall.

After the actuator assembly is completed as described, it is mounted in the housing, and to properly locate the same, the leg 59 of the angular stamping has tongues or tenons 60 and 61 projecting from its upper and lower edges, respectively. The latter of these tongues or tenons is stepped into a hole or mortise 62 in the offset rounded portion 33 of the spreader plate, and the upper tongue or tenon 60 engages in a hole 63 in the top wall 64 of the cover 11.

This places the leg 59 of the angular stamping substantially in parallelism with a portion of the front wall 12 of the housing body. Aligned holes 65 and 66 in the front wall 12 and the leg 59 of the angular stamping support the outer and inner ends respectively of a lock casing 67. The lock casing is inserted through the hole 65 from in front of the housing wall 12, with its cylinder in place, and is secured against withdrawal by the engagement of a cam 68 on the casing with a spring retainer 69. The cam has an inclined surface facing the inner end of the casing to depress the spring retainer during insertion and has an abrupt shoulder facing its outer end to snap behind the retainer upon complete insertion of the casing.

The spring retainer consists of a hairpin-shaped spring blade 70 mounted on an angularly bent end portion on the projection 29 of the spreader plate. Its free edge 71 is cut at an angle so as to be perpendicular to the axis of the lock cylinder and casing and engage squarely against the abrupt shoulder on the cam as shown in Figure 4.

Inward displacement of the lock casing is prevented by the engagement of the inner end of a longitudinal rib 72 projected therefrom with the front face of the leg 59. This rib 72 also serves to hold the casing against rotation by engaging between shoulders formed by downwardly punched portions 72' in the top wall of the cover as best shown in Figure 13.

It is to be observed that the eccentric driving cam 45 which projects from the inner end of the lock cylinder is pointed. This facilitates engagement thereof in the slot 46 of the actuator during insertion of the lock unit comprising the casing 67 and the cylinder 43.

The partition wall 23 as noted hereinbefore divides the interior of the housing body into the closed bolt compartment A and a switch compartment B. This switch compartment is in an outwardly stepped or offset portion of the body. Its front wall, which is part of the front wall 12 of the body, has an opening 73 therein to receive the stem 74 of a switch handle 75.

One side wall of the switch compartment is defined by the offset side wall portion 18' of the body. Its bottom is defined by the riser 18" joining the side wall 18' with the side wall 18 of the bolt housing. The top edge of the side wall 18' extends diagonally downwardly toward the rear, and the top edge of the partition wall 23 likewise extends downwardly at the same angle.

The top and rear of the switch compartment are closed by an insulated terminal block 76, the side edges of which are offset on a diagonal line to accommodate the inclined side edges of the side wall 18' and the partition wall 23.

This terminal block is secured in place by screws (not shown) passing through it and threaded in lugs 77 and 78 formed as an integral part of the stamping constituting the partition wall 23. The stationary contacts of the switch are carried by the terminal block as are also the external terminals for the switch.

The contactor 79 of the switch is drivingly connected with the stem 74 of the switch handle and is biased toward the rear by a spring 80 mounted on the stem. The drive mechanism by which the switch handle is connected with the contactor includes a cup-shaped stamping 81, the mouth of which is cylindrical to receive the adjacent end of the spring 80 but the bottom portion 82 of which is substantially oval shaped as best shown in Figure 7.

The adjacent end of the actuator has a hook portion 83 engageable with the side of the oval-shaped portion 82 when the cylinder is in its locked position of rotation to thereby lock the ignition switch against actuation to its "on" position. When the cylinder is turned to its unlocked position, the parts are in the positions shown in Figure 7 at which the hook 83 is free from the oval-shaped cup 82 to allow the switch to be actuated.

Upon turning the switch to its "on" position from the position shown in Figure 7, the oval-shaped cup 82 becomes turned with its larger diameter in line with the end of the hook 83, as indicated in dotted lines, whereby locking rotation of the cylinder is blocked.

While it may be possible to break into the switch compartment B and thus defeat the ignition switch lock, the steering column remains locked and cannot be released. Forced entry into the switch compartment although it exposes the actuator 47, is of no avail, for as noted hereinbefore, force applied to the actuator end portion in the switch compartment merely results in breakage of the actuator at its frangible throat 52.

The attachment of the entire structure to the dashboard is conventionally effected by two studs 84 anchored in the wall 85 of the body in position to pass through holes provided in a rearwardly directed flange 86 of the dashboard.

In assembling the structure, the bolt-spreader plate and the actuator sub-assembly are first completed and then mounted in the body of the housing and secured there by spot welding. The cover is next secured in place by spot welding, and before the lock cylinder and switch mechanism are added, the assembly is painted.

Painting by spraying or otherwise after the parts have been assembled as described is perfectly feasible, as such working parts as the lock bolt can be freed by working it a few times until its powerful spring will operate it in spite of paint films.

In the embodiment of the invention just described, the interlock between the bolt and switch afforded by the bolt actuator is weakened inside the point at which it emerges from the closed bolt compartment so that an attempt to operate the locked bolt from the projecting end of the actuator merely results in breaking the link or actuator at its frangible throat.

In the two modified embodiments of the invention illustrated in Figures 14 to 20, inclusive, the link for locking the switch is not connected to the bolt but only to the eccentric cam on the lock cylinder.

As a result, opening the switch compartment and pulling on the link cannot impart direct force on the bolt. Such force would be carried by the eccentric cam of the cylinder and inasmuch as this cam is on "dead center" in the locked position, a pull on the link could impart no turning moment to the cylinder. It it were possible to apply a sufficient pull on the link to break the eccentric cam nothing would be gained as the sole connection to the bolt is through the cam.

The structure of the two modifications insofar as it differs from that shown in Figures 1 to 13, inclusive, will now be described.

In the embodiment shown in Figures 14 to 18, inclusive, the bolt 99 is of somewhat different design than that of the previous construction, but as before it is pivotally mounted on a pin 91 fitted in appropriate bearings formed as part of the spreader plate 92 which extends across the side walls of the housing to reinforce the same and to also form one wall of the closed bolt compartment A.

As in the previous construction, the active end of the bolt passes through a hole 93 in the spreader plate to receive support from the side edges of the hole, and a torsion spring 94 mounted on the pin 91 biases the bolt to its operative position.

Retraction of the bolt is effected by a direct connection between the eccentric cam 95 extended from the inner end of the lock cylinder 96 and a shoulder 97 formed as an integral part of the pivoted bolt (see Figure 17).

The lock assembly in this instance is held in place by a pin 98 driven into aligned holes in the housing sections with its inner end projecting into the lock casing.

As in the construction previously described, the means for retaining the lock assembly in place does not contact the armor cap of the cylinder and consequently this cap must be securely fixed to the cylinder.

The switch compartment B as best shown in Figure 15 is entirely outside the bolt compartment being located under an extension 99 of the main housing stamping. A box 100 is secured under this extension 99 and houses the switch. The bottom of the box is spaced from the extension a distance sufficient to accommodate the link 101 by which the switch is locked, and a guide plate 102.

The link 101 is guided for longitudinal sliding motion by lugs or tangs 103 on the guide plate, and enters the closed bolt compartment A.

It is to be noted that access to the link 101 is effectively guarded against by virtue of its disposition between the switch box and the extension 99. Hence, even though access may be had to the switch by forcing off its terminal block or base, this still would not expose the link 101.

The stem 104 of the switch handle passes through aligned holes in the extension 99, the guide plate 102, and the bottom of the switch box to provide for actuation of the contactor from above the extension 99. That portion of the stem 104 directly beneath the extension 99 has two diametrically opposite ribs or wings 105 formed thereon. The outer ends of these wings or ribs engage under the edge of the hole in the extension 99 to hold the switch handle in place, the handle being turned from its position of insertion after assembly as will be readily apparent.

One of these wings or ribs provides a key to engage in a notch or recess 106 in the small end of a keyhole-shaped opening 107 in one end of the link. The opposite end of the link has a transverse slot 108 therein to engage the eccentric driving cam 95 of the cylinder so that rotation of the cylinder slides the link longitudinally from a locked position shown in Figure 18 at which the notch 106 engages one of the wings or ribs 105 to an unlocked position at which the large end of the keyhole opening is in line with the switch handle stem.

Attention is also directed to the fact that when the switch is turned to its "on" position the wings 105 stand crosswise in the large end of the keyhole-shaped opening and thus prevent the rotation of the lock cylinder necessary to lock the steering gear.

The construction shown in Figures 19 and 20 is very much like that just described in that a slide plate 110 is also used to connect the cylinder driving cam 111 with the shaft 112 of the switch handle. A keyhole opening 113 in the slide accommodates the shaft 112 and interlocks with the shaft to hold the switch against actuation in one position of the link and to allow switch actuation in another position while securing the lock cylinder against rotation to its locked position. Also, as in the construction just described, the driving cam 111 bears against a boss 114 on the pivoted bolt.

The only point of material distinction resides in the manner in which the cylinder assembly is secured in place. It is accomplished in this instance by means of a thin steel spring 115 located directly under the top wall through which the cylinder casing is projected, to engage in a groove 116 in the armor cap 117 of the cylinder. The cylinder assembly may be snapped in place as in the embodiment shown in Figures 1 to 13, inclusive, but in addition the means for securing the assembly in place serves to hold the armor cap against displacement.

From the foregoing description, taken in connection with the accompanying drawings, it will be readily apparent to those skilled in the art that this invention provides a combined steering column and ignition switch lock which by virtue of its employment of stampings instead of castings may be made considerably cheaper than previous lock devices of this type.

What I claim as my invention is:

1. A steering column lock of the character described comprising: a housing fabricated entirely of stampings with the component parts thereof welded together, said housing having an opening to fit the steering column; an internal reinforcing wall in the housing connected between opposite outer walls of the housing and cooperating with the walls of the housing to form a closed bolt compartment; and a bolt pivotally mounted on said internal wall for movement to and from an operative position at which a part on the bolt projects through a hole in the reinforcing wall for engagement with the rotatable shaft of the steering column.

2. A steering column lock of the character described comprising: a housing fabricated of stampings with the component parts thereof welded together, said housing having outer and inner walls formed to provide an opening through the housing for the reception of a steering column, said inner wall joining the outer walls to reinforce the same and cooperating with other walls of the housing to provide a closed bolt compartment adjacent to said opening with said inner wall being adjacent to said opening to overlie a steering column on which the lock is mounted, said wall having a hole therethrough; and a bolt pivoted on said wall inside said bolt compartment with a part thereof projectable through said hole for engagement with the steering column, opposite edges of the hole being closely adjacent to the sides of the bolt to support the same against lateral displacement by force applied thereto by the rotatable shaft of the steering column.

3. A steering column lock comprising: a housing fabricated entirely of stamped sheet metal and comprising a box-like body portion having a hole to accommodate the steering column and having side walls adapted to embrace the column; a spreader plate connecting said side walls at a point close to the steering column; a bolt pivoted in the box-like body portion with its free end projectable through a hole in said spreader plate for engagement with the steering column, the sides of the hole in the spreader plate being closely adjacent to the sides of the bolt to hold the same against displacement as a result of forces applied thereto by rotation of the steering column; and lock mechanism for retracting the bolt.

4. A steering column lock of the character described comprising: a bolt housing fabricated entirely of stampings and including a box-like unit having a portion adapted to embrace a steering column, said portion having opposite side walls extending substantially tangentially from the steering column when the housing is in position thereon; tension means for drawing said side walls together to clamp the housing to the steering column; a spreader member between said side walls to support the same against collapsing inwardly under the force of said tension means, said spreader member having a hole therethrough; a bolt pivotally mounted inside the housing with a portion thereof projectable through said hole for engagement with the steering column; a spring biasing the bolt to its operative locking position engaging the steering column; and key-controlled means for retracting the bolt, the side walls of the hole in the spreader member through which the bolt passes being engageable by the bolt to support the same against stresses imposed on the bolt by turning force applied to the steering column.

5. In a steering column lock of the type mounted on the column with a bolt projectable into locking engagement with the rotatable shaft of the column: a housing fabricated of stampings and including a box-like unit having a hole in one wall to receive the steering column, and side walls at an angle to said wall, said side walls being positioned to embrace the steering column; a spreader plate spanning the distance between said side walls and secured thereto, said spreader plate having a hole; a bolt pivotally mounted on the spreader plate with its free end projectable through said hole for locking engagement with the shaft of the steering column; a spring biasing the bolt to operative locking position; and key-controlled means enclosed within said fabricated housing for retracting the bolt.

6. In a combined steering column and ignition switch lock of the character described: a housing fabricated of sheet metal stampings; a partition wall in said housing dividing the same into a bolt compartment and a switch compartment; a bolt mounted in the bolt compartment movable to and from an operative position engageable with the rotatable shaft of the steering column; lock means projecting into the bolt compartment and operable from the exterior of the housing for retracting the bolt; an actuator connecting the lock means with the bolt; an extension on said actuator passing through a hole in the partition wall for locking the switch mechanism; and a frangible throat connecting said extension with the actuator adjacent to the point said extension emerges through the partition wall so that force applied to said extension in an effort to retract the bolt results in breakage at said frangible throat.

7. In a combined steering column and ignition switch lock: a housing adapted to be mounted on the steering column; means dividing the interior of the housing into a bolt compartment and a switch compartment; a bolt in the bolt compartment biased to an operative position engageable with the rotatable shaft of the steering column; key-controlled lock means entering the bolt compartment and operable from the exterior of the housing; and a bolt actuator pivoted in the housing connected with the lock means and operable upon actuation thereof to retract the bolt, said pivoted actuator having a switch locking extension protruding through a hole in the partition wall into the switch compartment, and being weakened adjacent to the part thereof received in said hole to give way under force applied to the extension in the switch compartment in the event of attempted retraction of the bolt by force applied to said extension.

8. In a combined steering column and ignition switch lock of the character described: a housing fabricated entirely of sheet metal stampings; a spreader plate extending between spaced side walls of the housing, said spreader plate having a hole therethrough; a bolt pivotally mounted on the spreader plate with a part thereof projectable through said hole for engagement with the rotatable shaft of the steering column; a spring biasing the bolt to its operative locking position; a lock device including a key operable lock cylinder entering a hole in one wall of the housing and supported in said hole; a wall supported between the spreader plate and an external wall of the housing and having a hole in line with the hole in said external wall of the housing to support the inner end of the lock device; and a pivoted actuator connected with the lock cylinder and operable on the bolt to translate rotation of the cylinder into retraction of the bolt.

9. In a lock device of the character described: a housing fabricated entirely of sheet metal stampings; a pivoted bolt biased to an operative position and mounted inside the housing; a lock cylinder entering the housing and rotatable by proper key; an actuator for translating rotation of the lock cylinder into retraction of the bolt; and means mounting the actuator inside the housing comprising a partition wall rigidly supported inside the housing and having a hole therethrough with a groove leading from one side of the hole; an angular stamping having one leg thereof secured to said partition wall, said leg having a groove contiguous with the groove in the partition wall; a pivot pin disposed in said contiguous grooves and clamped between said leg of the angular stamping and the partition wall, said pivot pin projecting into alignment with the hole in the partition wall, and the actuator being pivoted on the pin and having a part thereof disposed in said hole in the partition wall.

10. An actuator assembly for a lock device of the character described comprising: a stamping having a flat wall provided with a hole therethrough and a groove extending from one side of the hole; another stamping having a flat wall provided with a groove therein; means securing said stampings together with their grooves contiguous; a pin in said grooves and clamped between the stampings; said pin projecting into alignment with the hole in the first-named stamping; a lever pivoted on said projecting end of the pin with one end portion thereof, projecting through said hole in the first-named stamping, one end portion of the lever having an opening to receive the eccentric driving cam of a rotatable lock cylinder so that upon rotation of the lock cylinder the lever will be rocked on the pin; and a part of the second designated stamping having means providing a bearing for the lock cylinder to support the cylinder adjacent to its connection with the lever.

11. An actuator assembly for a lock device of the character described comprising: a stamping having a flat wall provided with a hole therethrough and a groove extending from one side of the hole; another stamping having a flat wall provided with a groove therein; means securing said stampings together with their grooves contiguous; a pin in said grooves and clamped between the stampings; said pin projecting into alignment with the hole in the first-named stamping; a lever pivoted on said projecting end of the pin with one end portion thereof projecting through said hole in the first-named stamping, one end portion of the lever having an opening to receive the eccentric driving cam of a rotatable lock cylinder so that upon rotation of the lock cylinder the lever will be rocked on the pin; a part on the second designated stamping having means providing a bearing for the lock cylinder to support the cylinder adjacent to its connection with the lever; and said lever having a weakened portion between its point of pivotal support on the pin and the end thereof which projects through the hole in the first-named stamping.

12. An actuator assembly for a lock device of the character described comprising: a stamping having a flat wall provided with a hole therethrough and a groove extending from one side of the hole; another stamping having a flat wall provided with a groove therein; means securing said stampings together with their grooves contiguous; a pin in said grooves and clamped between the stampings; said pin projecting into alignment with the hole in the first-named stamping; a lever pivoted on said projecting end of the pin with one end portion thereof projecting through said hole in the first-named stamping, one end portion of the lever having an opening to receive the eccentric driving cam of a rotatable lock cylinder so that upon rotation of the lock cylinder the lever will be rocked on the pin; a part on the second designated stamping having means providing a bearing for the lock cylinder to support the cylinder adjacent to its connection with the lever; said lever having a weakened portion between its point of pivotal support on the pin and the end thereof which projects through the hole in the first-named stamping; and portions on the flat wall of the first-named stamping struck out toward said last-named end of the lever and extending far enough beyond the pivot pin to cover the weakened portion of the lever.

13. In a lock device of the character described: a housing fabricated of sheet metal stampings; a pivoted bolt inside the housing; a bolt actuator inside the housing and operable on the bolt to retract the same, said actuator comprising a pivoted lever having an opening to receive the eccentric cam on a lock cylinder so that rotation of the cylinder swings the actuator on its pivot; means fixed with relation to the pivot for the actuator providing a bearing inside the housing for the inner end of a lock unit; an external wall of the housing having a hole in line with said bearing; a lock unit comprising a casing and a rotatable cylinder with an eccentric driving cam projecting from its inner end insertable longitudinally through said hole to engage its inner end in the bearing, whereby said lock unit is jointly supported by said bearing and the edge of the hole; and means automatically operable upon insertion of the lock unit for securing the same against retraction.

14. In a lock device of the character described: a housing fabricated of sheet metal stampings; a pivoted bolt inside the housing; a bolt actuator inside the housing and operable on the bolt to retract the same, said actuator comprising a pivoted lever having an opening to receive the eccentric cam on a lock cylinder so that rotation of the cylinder swings the actuator on its pivot; means fixed with relation to the pivot for the actuator providing a bearing inside the housing for the inner end of a lock unit; an external wall of the housing having a hole in line with said bearing; a lock unit comprising a casing and a rotatable cylinder with an eccentric driving cam projecting from its inner end insertable longitudinally through said hole to engage its inner end in the bearing, whereby said lock unit is jointly supported by said bearing and the edge of the hole; a cam on the lock unit having an inclined surface facing its inner end and an abrupt shoulder facing its outer end; and a spring retaining member fixed inside the housing and engageable with said cam to snap back of said abrupt shoulder upon complete insertion of the lock unit.

15. In a lock device of the character described: a housing fabricated of sheet metal stampings; a pivoted bolt inside the housing; a bolt actuator inside the housing and operable on the bolt to retract the same, said actuator comprising a pivoted lever having an opening to receive the eccentric cam on a lock cylinder so that rotation of the cylinder swings the actuator on its pivot; means fixed with relation to the pivot for the actuator providing a bearing inside the housing for the inner end of a lock unit; an external wall of the housing having a hole in line with said bearing; a lock unit comprising a casing and a rotatable cylinder with an eccentric driving cam projecting from its inner end insertable longitudinally through said hole to engage its inner end in the bearing, whereby said lock unit is jointly supported by said bearing and the edge of the hole; means automatically operable upon insertion of the lock unit for securing the same against retraction; and means for holding the lock casing against rotation comprising a longitudinal rib on the casing, and inwardly pressed shoulders on a wall of the housing between which said longitudinal rib fits.

16. In a combined steering column and ignition switch lock of the character described: a housing fabricated of sheet metal stampings and providing a closed bolt compartment; a bolt pivotally mounted in the compartment; a lock unit including a rotatable cylinder entering said closed bolt compartment; a driving connection between the cylinder and the bolt whereby rotation of the cylinder retracts the bolt; and a switch locking link connected with the cylinder and protruding from the bolt compartment for locking a switch mounted exteriorly of the bolt compartment upon rotation of the lock cylinder to its locked position.

17. In a combined steering column and ignition switch lock of the character described: a housing fabricated of sheet metal stampings and defining a closed bolt compartment; a bolt pivoted within the compartment; a lock unit mounted in the bolt compartment and including a rotatable cylinder accessible from outside the bolt compartment; an eccentric driving cam on the cylinder; means on the bolt engageable by the eccentric driving cam so that rotation of the cylinder in one direction retracts the bolt; and a switch locking link connected to said eccentric driving cam and projecting from the closed bolt compartment for locking a switch mounted exteriorly of the bolt compartment.

18. In a lock device of the character described: a housing fabricated of sheet metal stampings and having a hole in an external wall thereof for the insertion of a lock unit; a lock unit comprising a casing and a cylinder rotatable therein, said unit being insertable through said hole; means inside the housing providing a bearing for the inner end of the casing; an armor cap fitted to the front end of the cylinder and extending to the full diameter of the casing; and a spring retainer directly under the edge of the hole in the exterior wall arranged to automatically interlock with said armor cap upon insertion of the lock unit to hold the lock unit in place.

19. In a steering column lock of the character described: a lock bolt movable to and from an operative locking position engaging a steering column; a pivoted actuator for retracting the bolt, said actuator having an apertured portion; and means mounting the actuator for pivotal motion comprising a stamping having a flat wall provided with a hole through which the apertured portion of the actuator extends in a direction crosswise of said flat wall of the stamping, said stamping having a groove extending from one side of the hole, another stamping having a flat wall provided with a groove therein, means securing said stampings together with their grooves contiguous; and a pin in said grooves and clamped between said stampings, said pin being received in the aperture of the actuator to pivotally mount the same from said stampings.

20. In a steering column lock having a lock bolt and retracting mechanism therefor: a housing of sheet metal wrapped about the steering column and extending laterally thereof to form an open sided box in which the lock bolt and its retracting mechanism is received; a cover plate fitted against the steering column and closing the open side of the box so as to cover the lock bolt and its retracting mechanism; and a partition plate lying across the portion of the housing which extends laterally from the steering column to close off the steering column from the interior of the housing and thereby prevent tampering with the bolt by tools inserted in the joint between the steering column, the housing and the cover plate.

21. In a steering column lock having a lock bolt and retracting mechanism therefor: a housing of sheet metal clasped about the steering column and extending laterally therefrom to form an open sided box in which the lock bolt and its retracting mechanism is received; a cover plate closing the open side of the box and fitting against the steering column; welds spaced along the joint between the housing and its cover at points accessible for welding; and overlapping flanges on the cover and the housing for concealing crevices at portions of the joints that are not sealed by welding against ingress of picking tools which otherwise might be capable of retracting the bolt.

EDWARD N. JACOBI.